(12) United States Patent
Laurent et al.

(10) Patent No.: US 11,770,880 B2
(45) Date of Patent: Sep. 26, 2023

(54) INDUCTION COOKING DEVICE

(75) Inventors: Mathilde Laurent, Paris (FR); Rene Gy, Bondy (FR); Stephanie Pelletier, Paris (FR); Gaelle Ferriz, Reims (FR)

(73) Assignee: EUROKERA S.N.C., Jouarre (FR)

( * ) Notice: Subject to any disclaimer, the term of this patent is extended or adjusted under 35 U.S.C. 154(b) by 0 days.

(21) Appl. No.: 13/990,303

(22) PCT Filed: Dec. 15, 2011

(86) PCT No.: PCT/FR2011/053007
§ 371 (c)(1),
(2), (4) Date: May 29, 2013

(87) PCT Pub. No.: WO2012/080672
PCT Pub. Date: Jun. 21, 2012

(65) Prior Publication Data
US 2013/0256301 A1 Oct. 3, 2013

(30) Foreign Application Priority Data
Dec. 17, 2010 (FR) .................... 10 60677

(51) Int. Cl.
*H05B 6/02* (2006.01)
*C03C 3/085* (2006.01)
*H05B 6/12* (2006.01)
*C03C 23/00* (2006.01)

(52) U.S. Cl.
CPC .............. *H05B 6/02* (2013.01); *C03C 3/085* (2013.01); *C03C 23/007* (2013.01); *H05B 6/1209* (2013.01)

(58) Field of Classification Search
CPC .......... H05B 6/1209; H05B 6/12; H05B 6/02; C03C 3/083; C03C 23/007; C03C 10/0027
USPC ............... 219/649, 600; 501/7; 126/1 R, 211
See application file for complete search history.

(56) References Cited

U.S. PATENT DOCUMENTS

| | | | |
|---|---|---|---|
| 2002/0026932 A1* | 3/2002 | Mitra et al. ................. | 126/39 D |
| 2003/0019864 A1 | 1/2003 | Krause et al. | |
| 2005/0250639 A1* | 11/2005 | Siebers et al. ................. | 501/68 |
| 2006/0160689 A1 | 7/2006 | Hsu et al. | |
| 2007/0149379 A1 | 6/2007 | Hsu et al. | |
| 2007/0179039 A1 | 8/2007 | El Khiati | |
| 2008/0035896 A1 | 2/2008 | Striegler et al. | |
| 2009/0212042 A1 | 8/2009 | Lee et al. | |
| 2010/0035745 A1* | 2/2010 | Murata ................... | C03C 3/097 |
| | | | 501/66 |

(Continued)

FOREIGN PATENT DOCUMENTS

| | | | | |
|---|---|---|---|---|
| DE | 0629820 A2 * | 12/1994 | ............ | F24C 15/102 |
| EP | 2 075 237 | 7/2009 | | |

(Continued)

OTHER PUBLICATIONS

U.S. Appl. No. 14/114,673, filed Oct. 29, 2013, Laurent, et al.

(Continued)

*Primary Examiner* — Tu B Hoang
*Assistant Examiner* — Alba T Rosario-Aponte
(74) *Attorney, Agent, or Firm* — Element IP, PLC

(57) ABSTRACT

The subject of the invention is an induction cooking device comprising at least one inductor positioned under a thermally or chemically strengthened glass plate, the composition of the glass being of lithium aluminosilicate type.

19 Claims, 1 Drawing Sheet

(56) References Cited

U.S. PATENT DOCUMENTS

| | | | | |
|---|---|---|---|---|
| 2010/0089606 A1* | 4/2010 | Kwon et al. | ................ | 174/50.5 |
| 2010/0304090 A1* | 12/2010 | Henn | .................... | C03C 17/002 |
| | | | | 428/172 |
| 2012/0067865 A1* | 3/2012 | Siebers et al. | ............. | 219/445.1 |
| 2012/0085336 A1* | 4/2012 | Brunet et al. | ................. | 126/211 |

FOREIGN PATENT DOCUMENTS

| | | | | |
|---|---|---|---|---|
| EP | 2 094 060 | | 8/2009 | |
| FR | 2 861 720 | | 5/2005 | |
| GB | 2 079 119 | | 1/1982 | |
| GB | 2079119 A | * | 2/1982 | .............. H05B 6/12 |
| JP | 2000-310427 | | 11/2000 | |
| JP | 2002-179437 | | 6/2002 | |
| JP | 2007 39294 | | 2/2007 | |
| JP | 2007-09961 5 | | 4/2007 | |
| JP | 2007-099615 | | 4/2007 | |
| JP | 2008-8609 | | 1/2008 | |
| JP | 2009-293892 | | 12/2009 | |

OTHER PUBLICATIONS

U.S. Appl. No. 13/990,303, filed May 29, 2013, US2013/0256301 A1, Laurent, et al.

International Search Report dated Apr. 5, 2012 in PCT/FR11/053007 Filed Dec. 15, 2011.

http://www.us.schott.com/borofloat/english/production/index.html.

http://www.us.schott.com/borofloat/english/attribute/thermic/index.html.

Office Action dated Apr. 26, 2018, in corresponding Korean Patent Application No. 2013-7015346 (with English Translation), 7 pages.

\* cited by examiner

INDUCTION COOKING DEVICE

CROSS REFERENCE TO RELATED APPLICATIONS

The present application is a 35 U.S.C. § 371 national stage patent application of International patent application PCT/FR2011/053007, filed on Dec. 15, 2011, published as WO 2012/080672 on Jun. 21, 2012, the text of which is incorporated by reference, and claims the benefit of the filing date of French application no. 1060677, filed on Dec. 17, 2010, the text of which is also incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

STATEMENT REGARDING PRIOR DISCLOSURES BY THE INVENTOR OR A JOINT INVENTOR

Not Applicable.

BACKGROUND OF THE INVENTION

Field of the Invention

The invention relates to the field of induction cooking devices.

Description of the Related Art Including Information Disclosed Under 37 CFR 1.97 and 1.98

Induction cooking devices comprise at least one inductor positioned under a glass-ceramic plate. These devices are fitted into a worktop or into the frame of a cooker. The plate serves as a support for the cooking utensils (saucepans, frying pans, etc.), which are heated owing to the electric current induced within them by the magnetic field generated by the inductors. Lithium aluminosilicate glass-ceramics are used for this purpose owing to their thermal shock resistance, which is a result of their zero or almost zero thermal expansion coefficient. Glass-ceramics are produced by subjecting lithium aluminosilicate glass plates to a high-temperature heat treatment, which treatment generates within the plate crystals of beta-quartz or beta-spodumene structure, the thermal expansion coefficient of which is negative.

In 1980 it was proposed by patent application GB 2 079 119 to use, instead of glass-ceramic, thick glass plates (having a thickness of 5 or 6 mm) that are optionally tempered. Various compositions are envisaged: soda-lime compositions, borosilicate compositions, aluminosilicate compositions, etc. However, these plates were never marketed because their thermomechanical resistance proved insufficient for practical and daily use, so that induction cooking devices are, 30 years later, still based on glass-ceramic.

BRIEF SUMMARY OF THE INVENTION

The inventors have been able to bring to light glass compositions having properties suitable for forming glass plates which, after thermal or chemical strengthening, enable the actual use thereof in induction cooking devices, by satisfying the most rigorous tests.

The subject of the invention is an induction cooking device comprising at least one inductor positioned under a thermally or chemically strengthened glass plate, the composition of the glass being of lithium aluminosilicate type.

DETAILED DESCRIPTION OF THE INVENTION

Figure 1:
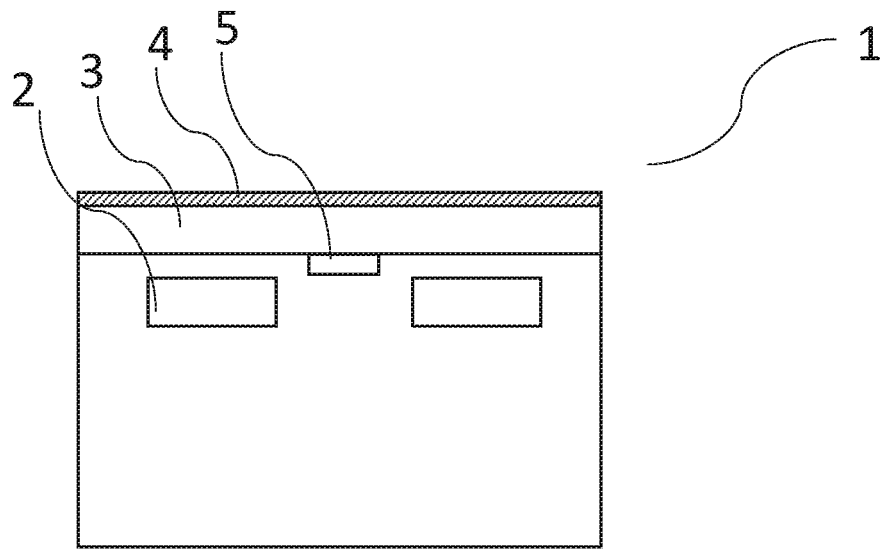
FIG. 1 illustrates an induction cooking device 1 that includes an inductor 2, a thermally strengthened glass plate 3, an opaque or substantially opaque coating 4 on the surface of the glass plate, and an internal element 5.
Figure 2:
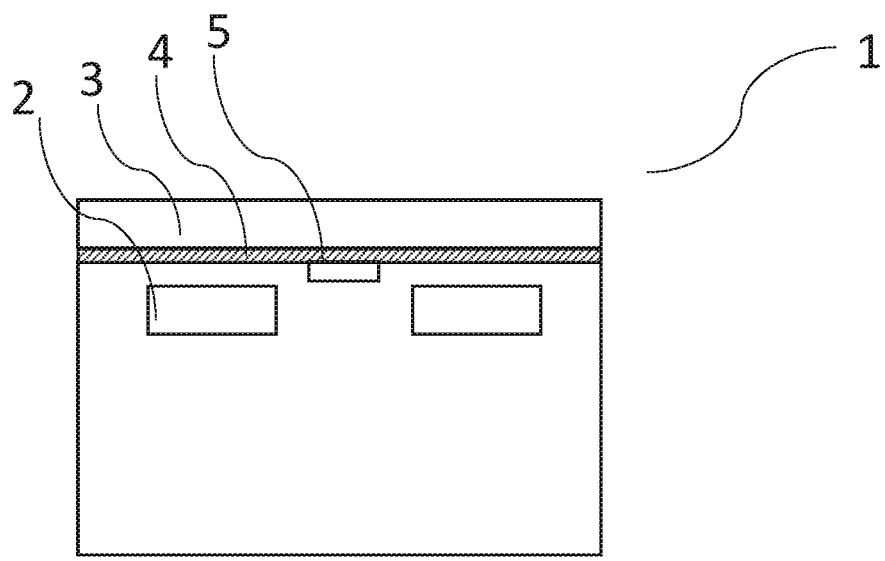
FIG. 2 illustrates an induction cooking device 1 that includes an inductor 2, a thermally strengthened glass plate 3, an opaque or substantially opaque coating 4 positioned between the glass plate and an internal element 5.

Thermal strengthening is also referred to as tempering or hardening. It consists in heating the glass beyond its glass transition temperature, then cooling it abruptly, generally by means of nozzles that transport air to the surface of the glass. As the surface cools more quickly than the core of the glass, compressive stresses are formed at the surface of the glass plate, balanced by tensile stresses at the core of the plate. Chemical strengthening, sometimes referred to as chemical tempering, is a treatment that uses ion exchange. The surface substitution of an ion of the glass plate (generally an alkali metal ion such as sodium or lithium) by an ion of larger ionic radius (generally an alkali metal ion, such as potassium or sodium), makes it possible to create residual compressive stresses at the surface of the glass plate down to a certain depth. Preferably, the glass is thermally strengthened.

Surprisingly, these glass compositions, owing to their properties which will be explained in detail below, make it possible to satisfy (after thermal or chemical strengthening, preferably thermal strengthening) the requirements in terms of thermomechanical resistance and to satisfy the usability tests.

The performances linked to these compositions and to their properties are such that it is possible to use them to form thin plates and/or plates of large lateral dimensions, which plates are the most likely to break. The thickness of the plate is preferably at most 4.5 mm, in particular 4 mm and even 3.5 mm. The thickness is generally at least 2 mm. The glass plate preferably has a lateral dimension of at least 0.5 m, or even 0.6 m. The largest dimension is generally at most 1.50 m.

The glass used in the device according to the invention preferably has at least one of the following six properties, in all possible combinations:

1. The product $E \cdot \alpha$ of the Young's modulus and of the linear thermal expansion coefficient of the glass is between 0.2 and 0.8 MPa·K$^{-1}$, in particular between 0.3 and 0.5

MPa·K$^{-1}$. Too low a product E·α makes the thermal tempering more difficult, whereas too high a product E·α reduces the thermal shock resistance.

2. The lower annealing temperature of the glass is at least 600° C., in particular 620° C. and even 630° C. This temperature is preferably at most 800° C., in particular 700° C. Frequently referred to as the "strain point" in the art, it corresponds to the temperature at which the viscosity of the glass is $10^{14.5}$ Poise (1 Poise=0.1 Pa·s). The lower annealing temperatures of the glasses according to the invention make it possible to avoid any detempering of the glass during the operation of the cooking device.

3. The linear thermal expansion coefficient of the glass is at most $50 \times 10^{-7}$ K$^{-1}$, and in particular is between 35 and $45 \times 10^{-7}$ K$^{-1}$. High thermal expansion coefficients do not make it possible to obtain a satisfactory thermal shock resistance. On the other hand, too low a thermal expansion coefficient makes it difficult to obtain sufficient strengthening.

4. The c/a ratio of the glass before strengthening is at most 0.5, in particular 0.2, even 0.1, after Vickers indentation under a load of 1 kg, c being the length of the radial cracks and a being the half-diagonal of the Vickers impression. This ratio is even preferably zero. Surprisingly, this property, though measured before strengthening, has proved to have an impact of prime importance on the resistance of the plates during the actual operation of the cooking devices according to the invention. The inventors have been able to observe that lithium aluminosilicate glasses have the distinctive feature of exhibiting exceptionally low c/a ratios compared to other types of glass.

5. The σ/(e·E·α) ratio of the glass is at least 20 K·mm$^{-1}$, in particular 30 K·mm$^{-1}$, σ being the maximum stress generated at the core of the glass by the thermal strengthening, e being the thickness of the glass in mm, E being the Young's modulus and α being the linear thermal expansion coefficient of the glass. The σ/(e·E·α) ratio is normally at most 200 K·mm$^{-1}$, or even 100 K·mm$^{-1}$. This property has proved to have a significant impact for eliminating the risk of breakage of the plate during the operation of the cooking device.

6. The maximum stress generated at the core of the glass by the thermal strengthening is preferably at least 20 MPa, in particular 30 MPa, and even 40 MPa.

In order to optimize its thermomechanical resistance, the glass used according to the invention preferably has all these preferred features in combination. Other combinations are possible, especially the combinations of the properties 1+2, 1+3, 1+4, 1+5, 1+6, 2+3, 2+4, 2+5, 2+6, 3+4, 3+5, 3+6, 4+5, 4+6, 5+6, 1+2+3, 1+2+4, 1+2+5, 1+2+6, 1+3+4, 1+3+5, 1+3+6, 1+4+5, 1+4+6, 1+5+6, 1+2+3+4, 1+2+3+5, 1+2+3+ 6, 1+3+4+5, 1+3+4+6, 1+3+5+6, 1+4+5+6, 1+2+3+4+5, 1+2+3+4+6, 1+2+3+5+6, 1+2+4+5+6, 1+3+4+5+6.

In particular, the glass used is preferably thermally tempered and preferably has the following characteristics: its thickness is at most 4.5 mm, the c/a ratio is at most 0.5, in particular 0.2, or 0.1 and even 0, and the σ/(e·E·α) ratio is at least 20 K·mm$^{-1}$, or even 30 K·mm$^{-1}$.

The linear thermal expansion coefficient is measured according to the ISO 7991:1987 standard between 20° C. and 300° C. The lower annealing temperature is measured according to the ISO 7884-7:1987 standard.

The Young's modulus (or modulus of elasticity) is measured by four-point bending on a glass test specimen 100×10×4 mm$^3$. The two lower supports are located at a distance of 90 mm from one another, whereas the two upper supports are located at a distance of 30 mm from one another. The upper supports are centered relative to the lower supports. The force is applied to the middle of the test specimen, from above. The strain is measured using a tensometer, and the Young's modulus is calculated as being the ratio between the stress and the strain.

The c/a ratio is measured as explained in detail below. A Vickers indenter of TestWell FM7 type is loaded to P=1000 g at room temperature, for 30 s, the descent speed being equal to 50 μm/s. The measurements of a (half-diagonal of the Vickers impression) and c (length of the radial cracks, starting from the corners of the impression, in the direction of the diagonal) are carried out using an optical microscope 1 h after the experiment.

The core stress σ is measured by photoelasticity using a polariscope, for example the polariscope sold by the company GlasStress Ltd. under the name SCALP-04.

The chemical composition of the glass preferably comprises silica SiO$_2$ in a weight content ranging from 49% to 75%, alumina Al$_2$O$_3$ in a weight content ranging from 15% to 30% and lithium oxide Li$_2$O in a weight content ranging from 1% to 8%. As explained in the remainder of the text, the presence of lithium oxide in the composition, in combination with alumina, makes it possible to combine a large number of advantages which make these compositions particularly attractive for the intended application. The chemical composition of the glass is preferably free of boron oxide (B$_2$O$_3$).

The chemical composition of the glass preferably comprises (or essentially consists of) the following constituents, varying within the weight limits defined below:

| | |
|---|---|
| SiO$_2$ | 49-75% |
| Al$_2$O$_3$ | 15-30% |
| Li$_2$O | 1-8% |
| K$_2$O | 0-5% |
| Na$_2$O | 0-5% |
| ZnO | 0-5% |
| MgO | 0-5% |
| CaO | 0-5 |
| BaO | 0-5% |
| SrO | 0-5% |
| TiO$_2$ | 0-6% |
| ZrO$_2$ | 0-5% |
| P$_2$O$_5$ | 0-10% |
| B$_2$O$_3$ | 0-5%, preferably 0. |

One particularly preferred chemical composition comprises (or essentially consists of) the following constituents, varying within the weight limits defined below:

| | |
|---|---|
| SiO$_2$ | 52-75% |
| Al$_2$O$_3$ | 18-27% |
| Li$_2$O | 2.5-5.5% |
| K$_2$O | 0-3% |
| Na$_2$O | 0-3% |
| ZnO | 0-3.5% |
| MgO | 0-3% |
| CaO | 0-2.5 |
| BaO | 0-3.5% |
| SrO | 0-2% |
| TiO$_2$ | 0-5.5% |
| ZrO$_2$ | 0-3% |
| P$_2$O$_5$ | 0-8% |
| B$_2$O$_3$ | 0-3%, preferably 0. |

Such compositions are already used for forming glass plates intended to be ceramized. Once tempered (but not ceramized, since they remain in the glass state), these compositions have proved particularly well suited to use as an induction device plate. These compositions generally have at least one of the preferred properties described above, or even for some of them, all of these properties. In particular, the preferred compositions have a c/a ratio that is very low, often 0.

Silica ($SiO_2$) is the main glass former oxide. High contents will contribute to increasing the viscosity of the glass beyond what is acceptable, whereas excessively low contents will increase the thermal expansion coefficient. Alumina ($Al_2O_3$) also contributes to increasing the viscosity of the glass and to decreasing its expansion coefficient. It has a beneficial effect on the Young's modulus.

Lithium oxide ($Li_2O$) is preferably the only alkali metal oxide present in the composition, apart from the inevitable impurities. Excessively high contents increase the tendency of the glass to devitrify. Alkali metal oxides make it possible to fluidify the glass and therefore to facilitate the melting and the refining thereof, but sodium oxide and potassium oxide have the disadvantage of increasing the thermal expansion coefficient of the glass and of reducing its lower annealing temperature. Lithium oxide makes it possible to maintain low thermal expansion coefficients compared to the other alkali metal oxides. It has also been observed that lithium oxide made it possible to obtain exceptionally low values of the c/a ratio, even in certain cases zero values, which are particularly beneficial in the targeted application. The high mobility of the lithium ion, due to its small size, could be the cause of this property.

Alkaline-earth metal oxides and also barium oxide (BaO) are used to facilitate the melting of the glass and the refining thereof, due to their effect of reducing the viscosity at high temperature.

Magnesium oxide and zinc oxide have proved particularly useful for obtaining low c/a ratios. On the other hand, the oxides of calcium, boron, strontium and barium have a tendency to increase this ratio, so their content is preferably reduced. Preferably, the composition of the glass is free of $B_2O_3$.

Titanium oxide and zirconium oxide are not obligatory, but their presence contributes to increasing the Young's modulus of the glass. The sum of their weight contents is therefore advantageously at least 1%, or even 2%.

The expression "consists essentially of" should be understood to mean that the aforementioned oxides constitute at least 96%, or even 98% of the weight of the glass. The composition usually comprises additives that are used for refining the glass or for coloring the glass. The refining agents are typically chosen from arsenic oxide, antimony oxide, tin oxide, cerium oxide, halogens, metal sulfides, especially zinc sulfide. The weight content of refining agents is normally at most 1%, preferably between 0.1 and 0.6%. The coloring agents are iron oxide, present as an impurity in most of the batch materials, cobalt oxide, chromium oxide, copper oxide, vanadium oxide, nickel oxide, selenium. The total weight content of coloring agents is normally at most 2%, or even 1%. The introduction of one or more of these agents may result in a dark plate of glass, having a very low light transmission (typically of at most 3%, in particular 2% and even 1%) being obtained, which will have the advantage of concealing the inductors, the electric wiring, and also the control and monitoring circuits of the cooking device. Another alternative, described further on in the text, consists in equipping a portion of the surface of the plate with an opaque or substantially opaque coating, or in positioning an opaque material, preferably of dark color, between the plate and the internal elements of the device.

The plates may be manufactured in a known manner by melting pulverulent batch materials then forming of the glass obtained. The melting is typically carried out in refractory furnaces with the aid of burners that use air or, better still, oxygen as oxidizer and natural gas or fuel oil as fuel. Molybdenum or platinum resistors submerged in the molten glass may also provide all or some of the energy used for obtaining a molten glass. Batch materials (silica, spodumene, petalite, etc.) are introduced into the furnace and undergo, under the effect of the high temperatures, various chemical reactions, such as decarbonation reactions, actual melting reactions, etc. The maximum temperature reached by the glass is typically at least 1500° C., in particular between 1600° C. and 1700° C. The glass can be formed into plates in a known manner by rolling the glass between metal or ceramic rolls, or else by the float process, a technique that consists in pouring the molten glass onto a bath of molten tin.

As indicated above, it is preferable for the glass plate to be capable of concealing the inductors, the electric wiring, and also the control and monitoring circuits of the cooking device. Preferably, only the display devices are visible to the user. In particular when the transmission of the glass plate as is is too high (typically above 3%), it is possible to provide a portion of the surface of the plate (that which, in the cooking device, is located opposite the elements to be concealed) with a coating deposited on and/or underneath the plate, said coating having the ability to absorb and/or reflect and/or scatter the light radiation. The coating may be deposited underneath the plate, that is to say on the surface facing the internal elements of the device, also referred to as the "lower face", and/or on the plate, that is to say on the upper face.

The coating may be continuous or discontinuous, for example may have patterns, or a mesh or spotted or speckled screen. It may especially be a screened enamel positioned on the upper face of the plate. In certain cases, the coating may be continuous in certain zones, and discontinuous in other zones. Thus, it is possible to have a discontinuous coating level with the heating elements and a continuous coating elsewhere, while reserving an uncoated zone opposite the light-emitting devices. The light transmission of the plate equipped with its coating, in the coated zones, is preferably at most 0.5% and even 0.2%. The coating may be completely opaque.

The zone opposite the light-emitting devices may also be provided with a coating, on condition that this coating is not opaque.

Advantageously, the plate also comprises a decoration on the upper face, generally made of enamel, the role of which is decorative, and which is not intended to mask the internal elements of the cooking device. The decoration generally makes it possible to identify the heating zones (for example by representing them in the form of a circle), the control zones (especially the touch-sensitive controls), and the zones for providing information or representing a logo. This decoration should be differentiated from the coating described above and more specifically in what follows, which constitutes a real masking means.

Preferably, the coating may be an organic-based layer, such as a layer of paint or of lacquer, or a mineral-based layer, such as an enamel or a metallic or metal oxide, nitride, oxynitride or oxycarbide layer. Preferably, the organic layers will be deposited on the lower face, whereas the mineral layers, especially the enamels, will be deposited on the upper face.

The paint which may be used is advantageously chosen so as to withstand high temperatures and to exhibit stability, over time, with respect to its color and its cohesion with the plate, and so as not to adversely affect the mechanical properties of the plate.

The paint used advantageously has a degradation temperature of greater than 300° C., in particular between 350° C. and 700° C. It is generally based on resin(s), where appropriate filled (for example with pigment(s) or dye(s)), and is optionally diluted in order to adjust its viscosity for the purpose of applying it to the plate, the diluent or solvent (for example white spirit, toluene, solvents of aromatic hydrocarbon type, such as the solvent sold under the trademark Solvesso 100® by Exxon, etc.) being, where appropriate, removed during the subsequent baking of the paint.

For example, the paint may be a paint based on at least one silicone resin, in particular a silicone resin modified by the incorporation of at least one radical such as an alkyd or phenyl or methyl radical, etc. It is also possible to add pigments as colorants, such as pigments for enamels (chosen for example from components containing metal oxides, such as chromium oxides, copper oxides, iron oxides, cobalt oxides, nickel oxides, or from copper chromates, cobalt chromates, etc.), $TiO_2$, etc. It is also possible to use, as pigments, particles of one or more metals such as aluminum, copper, iron, etc., or alloys based on at least one of these metals. The pigments may also be "effect pigments" (pigments having a metallic effect, interference pigments, pearlescent pigments, etc.), advantageously in the form of aluminum oxide ($Al_2O_3$) flakes coated with metal oxides; mention may be made, for example, of the pigments sold by MERCK under the trademark Xirallic®, such as $TiO_2/Al_2O_3$ pigments or interference pigments (Xirallic® T-50-10SW Crystal Silver or Xirallic® T-60-23SW Galaxy Blue or Xirallic® T-60-24SW Stellar Green), or $Fe_2O_3/Al_2O_3$ pigments (Xirallic® T-60-50SW Fireside Copper or Xirallic® F-60-51 Radiant Red). Other effect pigments that may be used are, for example, pearlescent pigments based on mica particles coated with oxides or a combination of oxides (chosen, for example, from $TiO_2$, $Fe_2O_3$, $Cr_2O_3$, etc.), such as those sold under the trademark IRIODIN® by Merck, or based on silica platelets coated with oxides or a combination of oxides (like those above), such as those sold under the trademark Colorstream® by Merck. Fillers or other conventional coloration pigments may also be incorporated with the aforementioned effect pigments.

Particularly preferably, the paint used comprises at least (or is based on) a high-temperature-resistant (co)polymer (in particular that has a degradation temperature above 400° C.), it being possible or not for this paint to contain at least one mineral filler in order to ensure its cohesion or its mechanical reinforcement and/or its coloration. This (co)polymer or resin may especially be one or more of the following resins: polyimide, polyamide, polyfluorinated, polysilsesquioxane and/or polysiloxane resin.

Polysiloxane resins are particularly preferred: they are colorless, and therefore capable of being colored (for example with fillers or pigments that give them the desired color); they may be used in the crosslinkable state (generally due to the presence of SiOH and/or SiOMe groups in their formula, these groups usually reaching up to 1 to 6% by weight of their total weight), or they be may converted (crosslinked or pyrolyzed). Advantageously, they have within their formula phenyl, ethyl, propyl and/or vinyl units, very advantageously phenyl and/or methyl units. They are preferably chosen from polydimethylsiloxanes, polydiphenylsiloxanes, phenylmethylsiloxane polymers and dimethylsiloxane/diphenylsiloxane copolymers.

The crosslinkable polysiloxane resins preferably used generally have a weight-average molecular weight (Mw) between 2000 and 300 000 Daltons.

It may be indicated, nonlimitingly, that Dow Corning® 804, 805, 806, 808, 840, 249, 409 HS and 418 HS resins, Rhodorsil® 6405 and 6406 resins from Rhodia, Triplus® resins from General Electric Silicone and SILRES® 604 resins from Wacker Chemie GmbH, used alone or as a mixture, are perfectly suitable.

The resins thus chosen are especially capable of withstanding induction heating.

The paint may be free of mineral fillers, especially if its thickness remains small. However, such mineral fillers are generally used, for example to mechanically strengthen the layer of paint deposited, to contribute to the cohesion of said layer and to its attachment to the plate, to combat the appearance and propagation of cracks within it, etc. For such purposes, at least one fraction of said mineral fillers preferably has a lamellar structure. The fillers may also be used for the coloring. Where appropriate, several types of complementary fillers may be used (for example colorless fillers for mechanical reinforcement and other fillers such as pigments for coloring). The effective amount of mineral fillers generally corresponds to a volume content of 10 to 60%, more particularly of 15 to 30% (volume contents based on the total volume of the fillers and of the paint).

The thickness of each paint layer deposited may be between 1 and 100 microns, in particular between 5 and 50 microns. The paint or resin may be applied by any suitable technique, such as brush deposition, doctor blade deposition, spraying, electrostatic deposition, dip-coating, curtain coating, screen printing, inkjet printing, etc. and preferably takes place by screen printing (or optionally doctor blade deposition). The screen-printing technique is particularly advantageous in that it readily makes it possible to reserve certain zones of the plate, especially the zones which will be facing the light-emitting devices, or even the zones located opposite the radiant heating means. When other techniques are used, the reserved areas may be obtained by placing suitable masks over the zones that are not desired to be covered.

The deposition may be followed by a heat treatment intended to provide, as the case may be, the drying, crosslinking, pyrolysis, etc. of the deposited layer(s).

Preferably, at least one layer of paint is chosen in which the resin has been, at least in part, crosslinked and/or pyrolyzed, partially or completely, and/or has not been heat treated (the resin may optionally be intended to be removed from the places where it has not been heat treated), said layer of paint consisting, in part or completely, of a mixture a) of mineral fillers and b) of at least one crosslinkable polysiloxane resin (almost free of precursor(s) of carbon-based material(s) and/or of at least one crosslinked polysiloxane resin (almost) free of carbon-based material(s) and of precursor(s) of carbon-based material(s) and/or of a porous mineral matrix based on silica (the resin having, for example, been pyrolyzed and therefore being mineralized), (almost) free of carbon-based material(s), the mineral fillers being distributed in the resin or the matrix.

The layer of paint is preferably covered with a protective layer, for example made of silicone resin modified by alkyl radicals or polysiloxane resin.

As indicated previously, the coating may also be an enamel. The enamel is formed from a powder comprising a glass frit and pigments (it being possible for these pigments to also be part of the frit), and from a medium for the application to the substrate.

The glass frit is preferably obtained from a vitrifiable blend comprising, generally, oxides chosen in particular from silicon oxide, zinc oxide, sodium oxide, boron oxide, lithium oxide, potassium oxide, calcium oxide, aluminum oxide, magnesium oxide, barium oxide, strontium oxide, antimony oxide, titanium oxide, zirconium oxide and bismuth oxide. Glass frits that are particularly suitable are described in applications FR 2782318 or WO 2009/092974.

The pigments may be chosen from the compounds containing metal oxides such as chromium oxide, copper oxide, iron oxide, cobalt oxide, nickel oxide, etc., or may be chosen from copper chromate or cobalt chromate, etc., the content of pigment(s) in the frit(s)/pigment(s) assembly being, for example, between 30% and 60% by weight.

The pigments may also be "effect pigments" (pigments having a metallic effect, interference pigments, pearlescent pigments, etc.), such as those cited previously in relation to a paint. The content of effect pigments may be, for example, of the order of 30% to 60% by weight relative to the base (glass frit) into which they are incorporated.

The layer may especially be deposited by screen printing (the base and the pigments being, where appropriate, put into suspension in a suitable medium generally intended to be consumed in a subsequent firing step, it being possible for this medium, in particular, to comprise solvents, diluents, oils, resins, etc.), the thickness of the layer being, for example, of the order of 1 to 6 μm.

The screen-printing technique is particularly advantageous in that it readily makes it possible to reserve certain zones of the plate, especially the zones which will be opposite the light-emitting devices.

The or each enamel layer used to form the coating is preferably a single layer, separated from other optional enamel layer(s), and having a thickness that does not generally exceed 6 μm, preferably that does not exceed 3 μm. The enamel layer is generally deposited by screen printing.

The coating may also be a metallic layer or a metal oxide, nitride, oxynitride or oxycarbide layer. The term "layer" should also be understood to include stacks of layers. This layer may be absorbent and/or reflective.

This layer may therefore be, for example, at least one single metallic or mainly metallic layer (for example a thin layer of Ag, W, Ta, Mo, Ti, Al, Cr, Ni, Zn, Fe, or of an alloy based on several of these metals, or a thin layer based on stainless steels, etc.), or may be a stack of (sub)layers comprising one or more metallic layers, for example a metallic (or mainly metallic) layer advantageously protected (coated on at least one face and preferably on its two opposite faces) by at least one layer based on a dielectric material (for example, at least one layer made from silver or aluminum coated with at least one $Si_3N_4$ protective layer—in particular an $Si_3N_4$/metal/$Si_3N_4$ stack—or an $SiO_2$ protective layer).

It may alternatively be a single-layer coating based on a dielectric material having a high refractive index n, that is to say a refractive index greater than 1.8, preferably greater than 1.95, and particularly preferably greater than 2, for example a single layer of $TiO_2$, or of $Si_3N_4$, or of $SnO_2$, etc.

In another advantageous embodiment, the layer may be formed from a stack of thin (sub)layers based on dielectric material(s) alternately having high (preferably greater than 1.8, or even 1.95, or even 2, as explained previously) and low (preferably less than 1.65) refractive indices, especially material(s) of the following types: metal oxide (or metal nitride or oxynitride), such as $TiO_2$, $SiO_2$ or mixed oxide (tin-zinc, zinc-titanium, silicon-titanium, etc.) or alloy, etc.; the (sub)layer that is deposited, where appropriate, first and that is therefore against the inner face of the plate, advantageously being a layer of high refractive index.

As the (sub)layer material having a high refractive index, mention may be made, for example, of $TiO_2$ or optionally $SnO_2$, $Si_3N_4$, $Sn_xZn_yO_z$, $TiO_x$ or $Si_xTi_yO_z$, ZnO, $ZrO_2$, $Nb_2O_5$, etc. As the (sub)layer material having a low refractive index, mention may be made, for example, of $SiO_2$, or optionally a silicon oxynitride and/or oxycarbide, or a mixed oxide of silicon and aluminum, or a fluoro compound, for example of the $MgF_2$ or $AlF_3$ type, etc.

The stack may comprise, for example, at least three (sub)layers, the layer closest to the substrate being a layer of high refractive index, the intermediate layer being a layer of low refractive index and the outer layer being a layer of high refractive index (for example, a stack comprising the following alternation of oxide layers: (substrate)—$TiO_2$/$SiO_2$/$TiO_2$).

The (geometric) thickness of each layer based on thin layer(s) that is deposited is generally between 15 and 1000 nm, in particular 20 and 1000 nm (the thickness of the substrate generally being a few millimeters, most often around 4 mm), it being possible for the thickness of each of the (sub)layers (in the case of a stack) to vary between 5 and 160 nm, generally between 20 and 150 nm (for example in the case of the $TiO_2$/$SiO_2$/$TiO_2$ stack, it may be around a few tens of nanometers, for example around 60-80 nm, for the $TiO_2$ layers and around 60-80 or 130-150 nm for the $SiO_2$ layer depending on the appearance, for example more silvery or more golden, that it is desired to obtain).

The layer based on one or more thin layers may be applied to the plate in line or in a subsequent step (for example after the cutting and/or shaping of said plate). It may especially be applied by (powder, liquid or gaseous) pyrolysis, by evaporation or by spraying. Preferably, it is deposited by spraying and/or by a vacuum and/or plasma-enhanced deposition method; in particular, the method of depositing the layer(s) by sputtering (for example, by magnetron sputtering), especially enhanced by a magnetic field (and in DC or AC mode) is used, the oxides or nitrides being deposited from one or more suitable metal or alloy or silicon or ceramic, etc., targets, if necessary under oxidizing or nitriding conditions (argon/oxygen or argon/nitrogen mixtures where appropriate). It is also possible to deposit, for example, oxide layers by reactive sputtering of the metal in question in the presence of oxygen and the nitride layers in the presence of nitrogen. To make the $SiO_2$ or $Si_3N_4$ it is possible to start from a silicon target that is lightly doped with a metal such as aluminum to make it sufficiently conductive. The (sub)layer(s) chosen according to the invention condense on the substrate in a particularly homogeneous manner, without separation or delamination occurring.

Besides the glass plate and at least one inductor (preferably three or four and even five), the cooking device may comprise at least one light-emitting device, at least one control and monitoring device, the assembly being in a housing.

A, the or each light-emitting device is advantageously chosen from light-emitting diodes (for example belonging to 7-segment displays), liquid crystal displays (LCDs), optionally organic, light-emitting diode (OLED) displays, and fluorescent displays (VFDs). The colors seen through the plate are diverse: red, green, blue and all the possible combinations, including yellow, violet, white, etc. These light-emitting devices may be purely decorative, for example may visually separate various zones of the plate. Most often however they will have a functional role displaying various information useful for the user, especially indication of the heating power, of the temperature, of cooking programs, of cooking time, of zones of the plate exceeding a predetermined temperature.

The control and monitoring devices generally comprise touch-sensitive controls, for example of the capacitive or infrared type.

All of the internal elements are generally attached to a housing, often metallic, which therefore constitutes the lower part of the cooking device, normally concealed in the worktop or in the body of the cooker.

The following examples illustrate the invention without however limiting it.

A sheet of lithium aluminosilicate glass with a thickness of 4 mm and having the weight composition defined below is produced in a known manner by melting and forming via rolling. Plates of 590×590 mm² are cut from this glass sheet.

| | |
|---|---|
| $SiO_2$ | 68.6% |
| $Al_2O_3$ | 19.5% |
| $Li_2O$ | 3.6% |
| ZnO | 1.8% |
| MgO | 1.2% |
| BaO | 0.8% |
| $TiO_2$ | 2.7% |
| $ZrO_2$ | 1.7% |
| $Fe_2O_3$ | 0.017%. |

The c/a ratio is 0.

The glass sheet is then thermally tempered, by heating at 840° C. and cooling in air, so that the maximum core stress is 50 MPa.

The properties of the glass sheet are the following:
Young's modulus (E): 78 GPa.
Linear expansion coefficient ($\alpha$): $41\times10^{-7}$ $K^{-1}$.
E·$\alpha$: 0.32 MPa/K.
Lower annealing temperature: 640° C.
$\sigma/(e·E·\alpha)$: 39 K/mm.

This plate is compared to two comparative plates of the same size, one being a glass plate of soda-lime-silica composition, the other being a glass plate of borosilicate composition.

The borosilicate glass has the following weight composition:

| | |
|---|---|
| $SiO_2$ | 79% |
| $Al_2O_3$ | 2.5% |
| $B_2O_3$ | 14.2% |
| $Fe_2O_3$ | 0.012% |
| $Na_2O$ | 3.6% |
| $K_2O$ | 0.6%. |

The soda-lime-silica glass has the following weight composition:

| | |
|---|---|
| $SiO_2$ | 69% |
| $Al_2O_3$ | 0.5% |
| CaO | 10.0% |
| $Na_2O$ | 4.5% |
| $K_2O$ | 5.5% |
| SrO | 7.0% |
| $ZrO_2$ | 3.5%. |

The properties of the soda-lime-silica glass plate are the following.

The thickness is 4 mm.
The c/a ratio is 3.4.
The glass sheet is thermally tempered so that the maximum core stress is 70 MPa.
Young's modulus (E): 76 GPa.
Linear expansion coefficient ($\alpha$): $76\times10^{-7}$ $K^{-1}$.
E·$\alpha$: 0.58 MPa/K.
Lower annealing temperature: 582° C.
$\sigma/(e·E·\alpha)$: 30 K/mm.

The properties of the borosilicate glass plate are the following.
The thickness of the glass is 3.8 mm.
The c/a ratio is 1.7.
The glass sheet is thermally strengthened so that the maximum core stress is 4 MPa.
Young's modulus (E): 64 GPa.
Linear expansion coefficient ($\sigma$): $32\times10^{-7}$ $K^{-1}$.
E·$\alpha$: 0.20 MPa/K.
Lower annealing temperature: 518° C.
$\sigma/(e·E·\alpha)$: 5 K/mm.

The usability tests of the plate are described below.
Each glass plate is subjected to a test cycle successively comprising the following steps:
2 passes of sand, with a load of 3.9 g/cm²,
an "empty saucepan" test, then, if the plate has not broken,
5 passes of a scouring pad sold under the name Scotch Brite Green, under a load of 1 kg/cm²,
an "empty saucepan" test, then, if the plate has not broken,
10 passes of a 4.5 kg stainless steel triple-bottom saucepan,
an "empty saucepan" test.

The "empty saucepan" test is carried out as follows. The center of the plate is positioned over the heating element of an induction hob equipped with an inductor of reference E.G.O. A2, without clamping of the edges of the plate. 200 milliliters of water are brought to boiling at maximum power, in a 20 cm diameter Lagostina Pandora saucepan. Once all of the water has evaporated, the hob is only turned off after the saucepan has been empty for 10 to 15 minutes. The maximum temperature reached by the plate on the lower face reaches 390° C.

The plate is judged to be satisfactory if no breakage is observed after this cycle of tests.

None of the 10 lithium aluminosilicate glass plates tested breaks after this cycle of tests. As regards the borosilicate glass plate on the other hand, the 10 plates tested broke. For the soda-lime-silica glass, 5 plates out of the 10 tested broke.

The lithium aluminosilicate glass is therefore far superior to the other glasses tested. The lithium aluminosilicate glass plate also withstands the thermal shock test described below. This test repeats the cycle defined above, but the empty saucepan test is replaced by a thermal shock test. In order to carry out this test, the center of the plate is exposed for 20 min to 420° C. using a radiant heating element then 100 ml of water at room temperature are poured over the heating zone.

None of the 5 lithium aluminosilicate glass plates tested broke at the end of this cycle.

The tempered lithium aluminosilicate glass therefore proves to be an advantageous replacement for lithium aluminosilicate glass-ceramics in induction heating devices.

The invention claimed is:
1. An induction cooking device, comprising:
an inductor; and
a thermally strengthened glass plate, wherein a glass of the glass plate is a lithium aluminosilicate comprising at least one of $TiO_2$ and $ZrO_2$, wherein at least one of $TiO_2$ and $ZrO_2$ is present and a combined content of $TiO_2$ and $ZrO_2$ is at least 2% by weight based on a total weight of the glass, wherein the chemical composition of the glass comprises silica $SiO_2$ in a weight content ranging from 49% to 75%, alumina $Al_2O_3$ in a weight content ranging from 15% to 30%, lithium oxide $Li_2O$ in a weight content ranging from 1% to 8%, and $Na_2O$ in a weight content ranging from 0% to 3%, all weights based on the total weight of the glass, wherein the inductor is positioned under the glass plate, wherein the device is suitable for operation at 390° C., wherein the glass plate does not break when the device operates at 390° C. to boil 200 mL of water and for 15 minutes afterward, and the device does not comprise a $Si_3N_4$ coating deposited on the glass plate.

2. The device of claim 1, wherein the thickness of the glass plate is at most 4.5 mm.

3. The device of claim 1, wherein the glass plate has a lateral dimension of at least 0.5 m.

4. The device of claim 1, wherein the product $E \cdot \alpha$ of the Young's modulus and of the linear thermal expansion coefficient of the glass is from 0.2 to 0.8 $MPa \cdot K^{-1}$.

5. The device of claim 1, wherein the lower annealing temperature of the glass is at least 600° C.

6. The device of claim 1, wherein the linear thermal expansion coefficient of the glass is at most $50 \times 10^{-7}$ $K^{-1}$.

7. The device of claim 1, wherein the c/a ratio of the glass before strengthening is at most 0.5, after Vickers indentation under a load of 1 kg, wherein c is the length of radial cracks and a is the half-diagonal of the Vickers impression.

8. The device of claim 1, wherein the $\sigma/e \cdot E \cdot \alpha$ ratio of the thermally tempered glass is at least 20 $K \cdot mm^{-1}$ wherein $\sigma$ is the maximum stress generated at the core of the glass by the thermal strengthening, e is the thickness of the glass in mm, E is the Young's modulus, and $\alpha$ is the linear thermal expansion coefficient of the glass.

9. The device of claim 1, wherein the maximum stress generated at the core of the glass by the thermal strengthening is at least 20 MPa.

10. The device of claim 1, wherein the glass is thermally tempered and has:
- a thickness of at most 4.5 mm;
- a c/a ratio of at most 0.5, wherein c is the length of radial cracks and a is the half-diagonal of the Vickers impression; and
- a $\sigma/(e \cdot E \cdot \alpha)$ ratio of at least 20 $K \cdot mm^{-1}$, wherein $\sigma$ is the maximum stress generated at the core of the glass by the thermal strengthening, e is the thickness of the glass in mm, E is the Young's modulus, and $\alpha$ is the linear thermal expansion coefficient of the glass.

11. The device of claim 1, wherein the chemical composition of the glass further comprises the following constituents, based on a total weight of the glass:

| | |
|---|---|
| $K_2O$ | 0-5%; |
| ZnO | 0-5%; |
| MgO | 0-5%; |
| CaO | 0-5%; |
| BaO | 0-5%; |
| SrO | 0-5%; |
| $TiO_2$ | 0-6%; |
| $ZrO_2$ | 0-5%; |
| $P_2O_5$ | 0-10%; and |
| $B_2O_3$ | 0-5%. |

12. The device of claim 11, wherein the chemical composition of the glass comprises the following constituents, based on a total weight of the glass:

| | |
|---|---|
| $SiO_2$ | 52-75%; |
| $Al_2O_3$ | 18-27%; |
| $Li_2O$ | 2.5-5.5%; |
| $K_2O$ | 0-3%; |
| $Na_2O$ | 0-3%; |
| ZnO | 0-3.5%; |
| MgO | 0-3%; |
| CaO | 0-2.5%; |
| BaO | 0-3.5%; |
| SrO | 0-2%; |
| $TiO_2$ | 0-5.5%; |
| $ZrO_2$ | 0-3%; |
| $P_2O_5$ | 0-8%; and |
| $B_2O_3$ | 0-3%. |

13. The device of claim 1, wherein a portion of the surface of the glass plate comprises an opaque or substantially opaque coating, or wherein an opaque material is positioned between the glass plate and internal elements of the device.

14. The device of claim 1, wherein both $TiO_2$ and $ZrO_2$ are present in the glass.

15. The device of claim 1, wherein the thickness of the glass plate is from 2 mm to 4 mm.

16. The device of claim 1, wherein the thickness of the glass plate is from 2 mm to 3.5 mm.

17. The device of claim 15, wherein the glass plate has a lateral dimension from 0.5 m to 1.50 m.

18. The device of claim 1, wherein the glass plate is formed by a float glass process.

19. The device of claim 18, wherein the float glass process comprises pouring a molten glass onto a bath of molten tin.

* * * * *